(12) United States Patent
Zhang (10) Patent No.: US 9,529,604 B2
(45) Date of Patent: Dec. 27, 2016

(54) METHOD, DEVICE AND SYSTEM FOR PUSHING INFORMATION (75) Inventor: Li Zhang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 463 days.

(21) Appl. No.: 14/081,933

(22) PCT Filed: Mar. 1, 2012

(86) PCT No.: PCT/CN2012/071815
§ 371 (c)(1),
(2), (4) Date: Mar. 3, 2014

(87) PCT Pub. No.: WO2012/155602
PCT Pub. Date: Nov. 22, 2012

(65) Prior Publication Data
US 2014/0317504 A1    Oct. 23, 2014

(30) Foreign Application Priority Data
May 18, 2011    (CN) .......................... 2011 1 0128815

(51) Int. Cl.
*G06F 17/30*    (2006.01)
*G06F 9/44*    (2006.01)
(Continued)

(52) U.S. Cl.
CPC .......... *G06F 9/4446* (2013.01); *H04L 12/1859* (2013.01); *H04L 51/04* (2013.01)

(58) Field of Classification Search
CPC ...... G06F 17/3087; G06F 9/4446; G06F 9/44; H04L 12/1859; H04L 51/04; H04L 43/08; H04L 51/32; H04L 51/10; H04L 51/16; H04L 61/6004; G06Q 30/0256; G06Q 30/0627; G06Q 10/10; H04N 1/04
(Continued)

(56) References Cited

U.S. PATENT DOCUMENTS 6,690,390 B1 * 2/2004 Walters ............... G06F 3/04895
715/705
7,739,620 B1 * 6/2010 Kong ................... G06F 3/0482
715/229
(Continued)

FOREIGN PATENT DOCUMENTS

| CN | 101030283 A | 9/2007 |
|---|---|---|
| CN | 101256598 A | 9/2008 |

(Continued)

OTHER PUBLICATIONS

Amy Hurst et al.—"Dynamic Detection of Novice vs. Skilled Use Without a Task Model"—CHI 2007 Proceedings o Expert/Novice Apr. 28-May 3, 2007 o San Jose, CA, USA—pp. 272-280.*

(Continued)

*Primary Examiner* — Anh Ly (57) ABSTRACT

A method, device and system for pushing information is disclosed by the present disclosure. The method comprises, obtaining and storing a microblog message published though an Instant Messaging client by a user; scanning the stored microblog message published by the user and obtaining keywords of the microblog message according to a preset extracting policy; and determining an application scene of the user according to the obtained keywords, matching the application scene with the corresponding prestored help information, and obtaining and pushing the matched help information.

10 Claims, 3 Drawing Sheets

(51) Int. Cl.
*H04L 12/18* (2006.01)
*H04L 12/58* (2006.01)

(58) Field of Classification Search
USPC ................. 715/708, 751; 707/770, 748, 803, 707/E17.044, E17.108, E17.032; 705/26.63
See application file for complete search history.

(56) References Cited

U.S. PATENT DOCUMENTS

| | | | | |
|---|---|---|---|---|
| 2007/0156648 A1* | 7/2007 | Bridges | ............... | G06F 9/4446 707/E17.014 |
| 2009/0100337 A1* | 4/2009 | Commarford | ........ | G06F 9/4446 715/708 |
| 2009/0106376 A1* | 4/2009 | Tom | ............... | G06Q 10/107 709/206 |
| 2009/0132920 A1* | 5/2009 | Deyo | ............... | G06F 9/4446 715/708 |
| 2009/0150779 A1* | 6/2009 | Kodama | ............... | G06F 9/4446 715/708 |
| 2009/0299998 A1* | 12/2009 | Kim | ............... | G06F 17/30864 707/E17.044 |
| 2010/0138778 A1* | 6/2010 | Dewan | ............... | G06F 9/4443 715/789 |
| 2010/0185519 A1 | 7/2010 | Ramaswamy | | |
| 2010/0228582 A1 | 9/2010 | King et al. | | |
| 2010/0251127 A1* | 9/2010 | Geppert | ............... | G06F 3/04817 715/735 |
| 2010/0312769 A1* | 12/2010 | Bailey | ............... | G06F 17/30705 707/740 |
| 2011/0099507 A1* | 4/2011 | Nesladek | ............... | G01C 21/265 715/780 |
| 2012/0158589 A1* | 6/2012 | Katzin | ............... | G06Q 20/12 705/44 |
| 2012/0197981 A1* | 8/2012 | Chan | ............... | G06Q 30/0276 709/203 |
| 2012/0198002 A1* | 8/2012 | Goulart | ............... | H04L 51/36 709/206 |
| 2012/0210215 A1* | 8/2012 | Chrabaszcz | ............... | G06F 9/4446 715/708 |
| 2013/0067008 A1* | 3/2013 | Ku | ............... | H04L 51/04 709/206 |
| 2013/0165086 A1* | 6/2013 | Doulton | ............... | G06Q 10/107 455/414.4 |
| 2013/0339465 A1* | 12/2013 | Zhang | ............... | H04L 51/16 709/206 |
| 2016/0043972 A1* | 2/2016 | Lan | ............... | H04L 51/32 709/206 |

FOREIGN PATENT DOCUMENTS

CN   101262494   9/2008
WO   2010/102012 A2   10/2010

OTHER PUBLICATIONS

M. C. Maguire—A review of user-interface design guidelines for public information kiosk system—International Journal of Human-Computer Studies—vol. 50, Issue 3, Mar. 1999, pp. 263-286.*
International Search Report of PCT/CH2012/071815 mailed May 17, 2012; 4 pages.

* cited by examiner

METHOD, DEVICE AND SYSTEM FOR PUSHING INFORMATION

CROSS-REFERENCE TO RELATED APPLICATIONS

This application is the National Stage of, and therefore claims the benifit of, International Application No. PCT/CN2012/071815 filed on Mar. 1, 2012, which claims the priority to Chinese Patent Application No. 201110128815.4, entitled "Method, Device and System for Pushing Information", filed on May 18, 2011, each of which is incorporated herein by reference in its entirety.

TECHNICAL FIELD

The present disclosure relates generally to the computer network technology, and more particularly to a method, device and system for pushing information.

BACKGROUND

With the development of the computer network technology, Instant Messaging (IM) tools have been accepted by most users, and have become an essential part of users' daily life and work. By IM tools, users can achieve communication and exchanges with friends, colleagues and classmates.

Microblog is a part of the IM tool application with a lower technical requirement for access. With the help of microblog, a user can instantly express his own feelings with a sentence comprising about 140 words, and share them with those users paying attention to him. The user can edit microblog messages in the microblog window, and view microblog messages that have been received. A presentation of a microblog message mainly includes a homepage message presentation, a page message presentation and private message presentation.

In actual application, microblog is a user relationship-based platform for information sharing, spreading and obtaining. On this platform, for instance, taking the homepage message presentation as an example, a user can, on the page (homepage) for homepage message presentation on the IM client, view the messages published by his friends whom he is interested in. The client arranges the messages according to the time they are published. That is to say, the message published most recently is put to the top, while those published earlier are put to the bottom. Messages are presented on the homepage, so that a user can learn his friends' latest state from the homepage very conveniently according to the presented messages. In microblog, a user can follow persons whom he is interested in, and in the meantime, other users can also follow this user. After a relevant relationship chain is established, all messages published by the user can be followed by his followers.

Microblog messages are a type of fragmented message. That is, by an IM client, a user can publish his own information in a way similar to sending text messages. For example, the user publishes a microblog message by the IM client at the current moment to state that he is on a plane for a business trip to Beijing. At the next moment, the user publishes another microblog message to describe that he has arrived in Beijing. His followers view the microblog messages published in fragmented times by the user according to the publishing time line of the user, and thus can learn the track of the user.

In actual application, users can also seek help information by microblog. For example, after a user checks in the hotel A in Beijing, he may want to find the restaurants near the hotel A. And then, he can publish a microblog message by an IM client to inquire for the restaurants nearby the hotel A. After receiving this microblog message, those followers who know restaurants near the hotel A can inform the user by pushing microblog messages or replying to him.

It can be seen from the above that according to the prior microblog-based method for seeking help information, followers push relevant help information to a user according to the help-seeking content. Due to the large number of the microblog users, the pushed information is too much and varied in content relevance. For example, the pushed information that is received may include a relatively large proportion of advertising information and information unrelated to the help-seeking information, so that the user has to spend a relatively larger amount of time on browsing the pushed information, which is difficult to identify, the accuracy and the reliability of pushing information is relatively low and the help-seeking efficiency is not high.

SUMMARY

In view of the above, one aim of the present disclosure is to propose a method for pushing information, which is able to improve the accuracy as well as the reliability in pushing information.

Another aim of the present disclosure is to propose a device for pushing information, which is able to improve the accuracy as well as the reliability in pushing information.

The third aim of the present disclosure is to propose a system for pushing information, which is able to improve the accuracy as well as the reliability in pushing information.

To achieve the above aims, the technical solutions of the present disclosure are implemented in the following way.

A method for pushing information, which for each user, comprises the following processes: obtaining and storing a microblog message published though an IM client by the user; scanning the stored microblog message and obtaining keywords of the microblog message according to a preset extracting policy; and determining an application scene of the user according to the obtained keywords, matching the application scene with corresponding prestored help information, and obtaining and pushing the matched help information.

A microblog backend server, comprising: a microblog message server, a statistical analysis server and a microblog intelligence server, wherein, the microblog message server is configured to store a microblog message published by a user, the statistic analysis server is configured to extract keywords from the microblog message according to a preset extracting policy, the microblog intelligence server is configured to determine an application scene of the use according to the extracted keywords, match the application scene with corresponding prestored help information, and obtain and push the matched help information.

A system for pushing information, the system comprising: an IM client, an access server and a microblog backend server, wherein, the IM client is configured to send, via the access server, a microblog message to be published to the microblog backend server, receive, via the access server, help information output by the microblog backend server, and display the help information to a user; and the microblog backend server is configured to obtain and store the microblog message published the Instant Messaging client by the user, scan the stored microblog message and obtain keywords of the microblog message according to a preset extracting policy; determine an application scene of the use according to the obtained keywords, match the application scene with corresponding prestored help information, and obtain and push the matched help information.

From the above mentioned technical solution, it can be seen that there are following operation in the method, device and system for pushing information provided by the present disclosure, obtaining and storing a microblog message published through an IM client by a user; scanning the stored microblog message and obtaining keywords of the microblog message according to a preset extracting policy; and determining an application scene of the user according to the obtained keywords, matching the application scene with corresponding prestored help information, and obtaining and pushing the matched help information. A microblog backend server is configured to extract the keywords, analyze the application scene of the user, and match the extracted keywords with the stored help information corresponding to the application scene. Thus, the pushed help information can be relatively concise, but has high relevance. The accuracy and the reliability in pushing information are improved.

BRIEF DESCRIPTION OF THE DRAWINGS

In order that the above mentioned and other features and advantages of the disclosure will be readily understood by those ordinary persons skilled in the art, a more detailed description of the exemplary embodiments of the disclosure will be rendered by reference to the appended drawings. In the drawings.

DETAILED DESCRIPTION

To further clarify the technical solution and advantages of the present disclosure, a detailed description of the present disclosure will further be given in the following, by combining the figures and the specific embodiments.

As a new Internet application, microblog is developing rapidly, and has become an important means for obtaining information and communicating. An embodiment of the present disclosure uses an IM client and a microblog backend server as carriers and proposes a method for pushing information. Intelligent ancillary services are provided by the microblog backend server. The microblog backend server obtains and stores a microblog message published through the IM client by the user, scans the stored microblog message published by the user and obtains the keywords of the microblog message according to a preset extracting policy; determines an application scene of the user according to the obtained keywords, matches the application scene with corresponding prestored help information, and obtains and pushes the matched help information.

Figure 1:
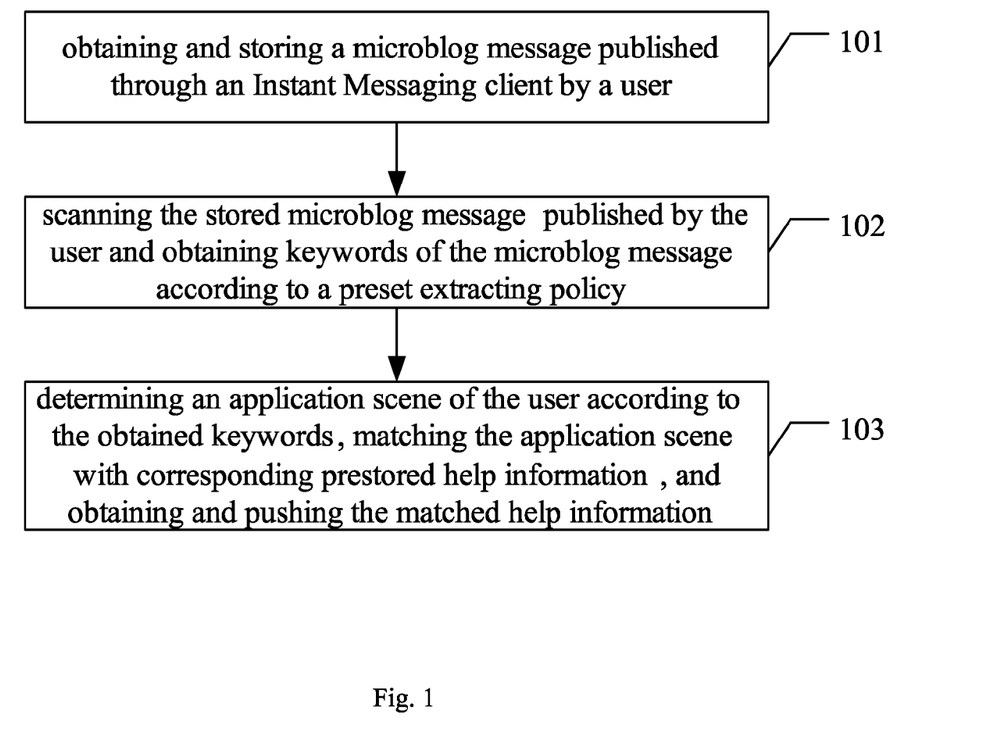
FIG. 1 is a flow diagram of the method for pushing information in an embodiment of the present disclosure.

FIG. 1 is a flow diagram of the method for pushing information in an embodiment of the present disclosure. For each user, the processing is executed according to the procedure as shown in FIG. 1, comprising:

Step 101, which includes obtaining and storing a microblog message published through an IM client by the user. In this step, the microblog backend server receives the microblog message from the user, and publishes it. In the meantime, the microblog backend server may store the microblog message in a microblog message content list, and identify the microblog message content list with the user ID. Microblog messages may include: homepage messages, page messages and private messages. Accordingly, microblog message pages may include: message homepage, a message page and private message page. The message homepage refers to a page of messages published by the user and his friends in microblog. The message page is a page of messages referring to the user (such as, appchen) in microblog, a page of messages referring to the microblog message of the user, and a page of message for replying to the user, etc. The private message page refers to a page of microblog messages which is communicated between the user and other users in private in microblog.

Step 102, which includes scanning the stored microblog message published by the user and obtaining keywords of the microblog message according to a preset extracting policy. In this step, the microblog message content list is scanned at regular time, and the keywords comprised in the microblog message content list are extracted according to the preset extracting policy. The preset extracting policy comprises matching the microblog message content list with the keyword lists corresponding to various application scenes and obtaining the keywords, which match the preset keyword lists corresponding to various application scenes, from the microblog message content list. Further, according to location information or user ID comprised in the microblog message body, an inquiry to the microblog backend server can be made. Stored basic profiles of the user can be obtained, such as age, the type of work, education and other information, for the sake of a subsequent better matching.

Step 103, which includes determining an application scene of the user according to the obtained keywords, matching the application scene with corresponding prestored help information, and obtaining and pushing the matched help information. In this step, according to the obtained keywords, the state (application scene) of the user is determined. That is, one keyword list that most matches the obtained keywords is determined among the keyword lists corresponding to various application scenes. An application scene corresponding to the one keyword list is set as the application scene of the user.

By the microblog backend server, according to the scene of the user, the prestored corresponding help information is matched with this application scene. Specific help information (help information) with user accounts is pushed, according to the application scene of the user, to the IM client the user logs in. The IM client receives the information with user accounts pushed by the microblog backend server, and displays it in a specific page. From the information displayed by the IM client, the user obtains the help information.

In an embodiment of the present disclosure, the help information may be stored in a form of cascading menus (classification), where first level menus of the help information are identified by application scenes, and each level submenus of the first level menus are identified by corresponding keywords.

In matching, according to the obtained keywords, the application scene of the user is determined. The first level menu of the help information corresponding to the application scene of the user is determined. According to the keywords comprised in the first level menu, the obtained keywords are traversed and the first level menu, to which the obtained keywords belong, is determined. According to keywords comprised in second level menu, the obtained keywords are traversed and the second level menu, to which the obtained keywords belong, is determined. Till the obtained keywords do not include keywords of a corresponding menu, the help information corresponding to the upper level menu of the corresponding menu is pushing. Of course, in actual application, the form of the cascading menus of the help information can also be all identified by keywords for matching.

As mentioned above, if the microblog backend server obtains the user's basic profiles according to location information or a user ID comprised in a microblog message body, then the obtained basic profiles of the user are rematched with the help information obtained by matching and the help information obtained by rematching is pushed.

Figure 2:
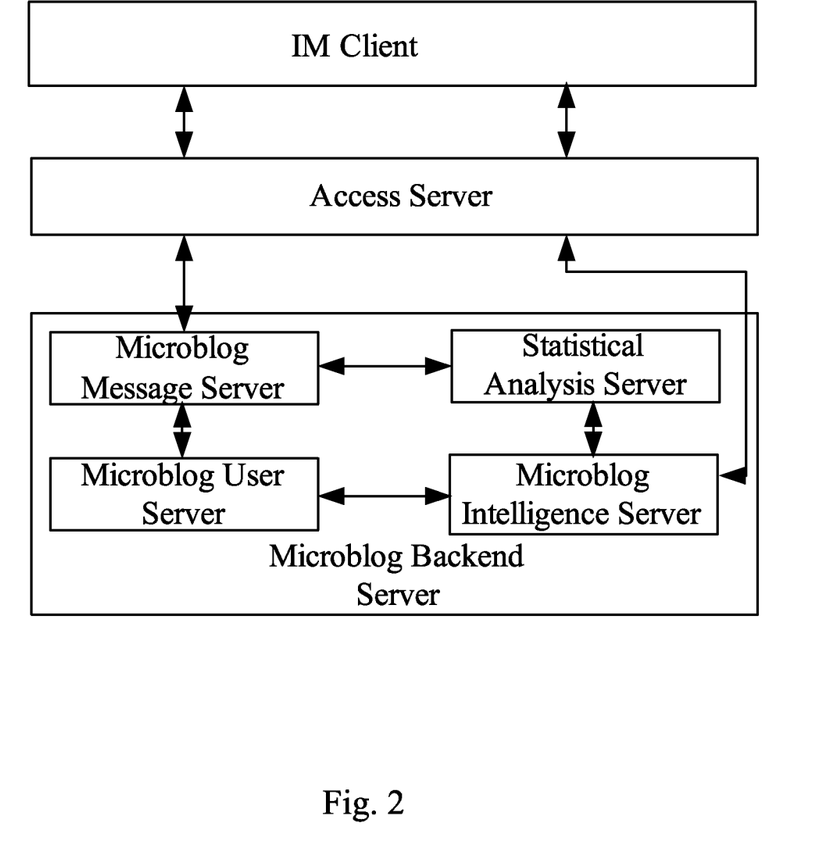
FIG. 2 is a structure diagram of the system for pushing information in an embodiment of the present disclosure.

FIG. 2 is a structure diagram of the system for pushing information in an embodiment of the present disclosure. As seen from FIG. 2, the system comprises: an IM client, an access server and a microblog backend server. The IM client is configured to send, via the access server, a microblog message to be published to the microblog backend server, receive, via the access server, help information output by the microblog backend server, and display the help information to a user. The microblog backend server is configured to obtain and store the microblog message published through the Instant Messaging client by the user, scan the published microblog message and obtain keywords of the microblog message according to a preset extracting policy; determine an application scene of the user according to the obtained keywords, match the application scene with corresponding prestored help information, and obtain and push the matched help information.

The microblog backend server comprises: a microblog message server, a microblog user server, a statistical analysis server and a microblog intelligence server. The microblog message server is configured to store the microblog message published by the user. The microblog user server is configured to store basic information of the user; and according to location information or a user ID comprised in a microblog message body of the microblog message, inquiry, obtain and output the stored basic information of the user to the microblog intelligence server to rematch with the help information obtained by matching. In an embodiment of the present disclosure, the basic information includes: following relationship information, basic profile information, user type information, authentication information, etc.

The statistical analysis server is configured to extract the keywords from the microblog message published by the user according to the preset extracting policy. The microblog intelligence server is configured to determine the application scene of the user according to the extracted keywords, match the application scene with the corresponding prestored help information, obtain and push the matched help information.

In an embodiment of the present disclosure, an intelligent processing of user accounts is executed based on the data source in the statistical analysis server. The microblog intelligence server, according to the location information, user-related profile information and keywords, matches the prestored help information to which the application scene corresponds. The microblog intelligence server automatically sends the matched help information to the user, wherein the help information is stored in a form of cascading menus and matched level by level. Of course, in actual application, corresponding advertising information may also be sent while sending the matched help information. An effective extension of the sent information may also be executed.

By referring to FIG. 1 and FIG. 2, a specific embodiment will be given in the following for a further detailed description of the present disclosure.

Figure 3:
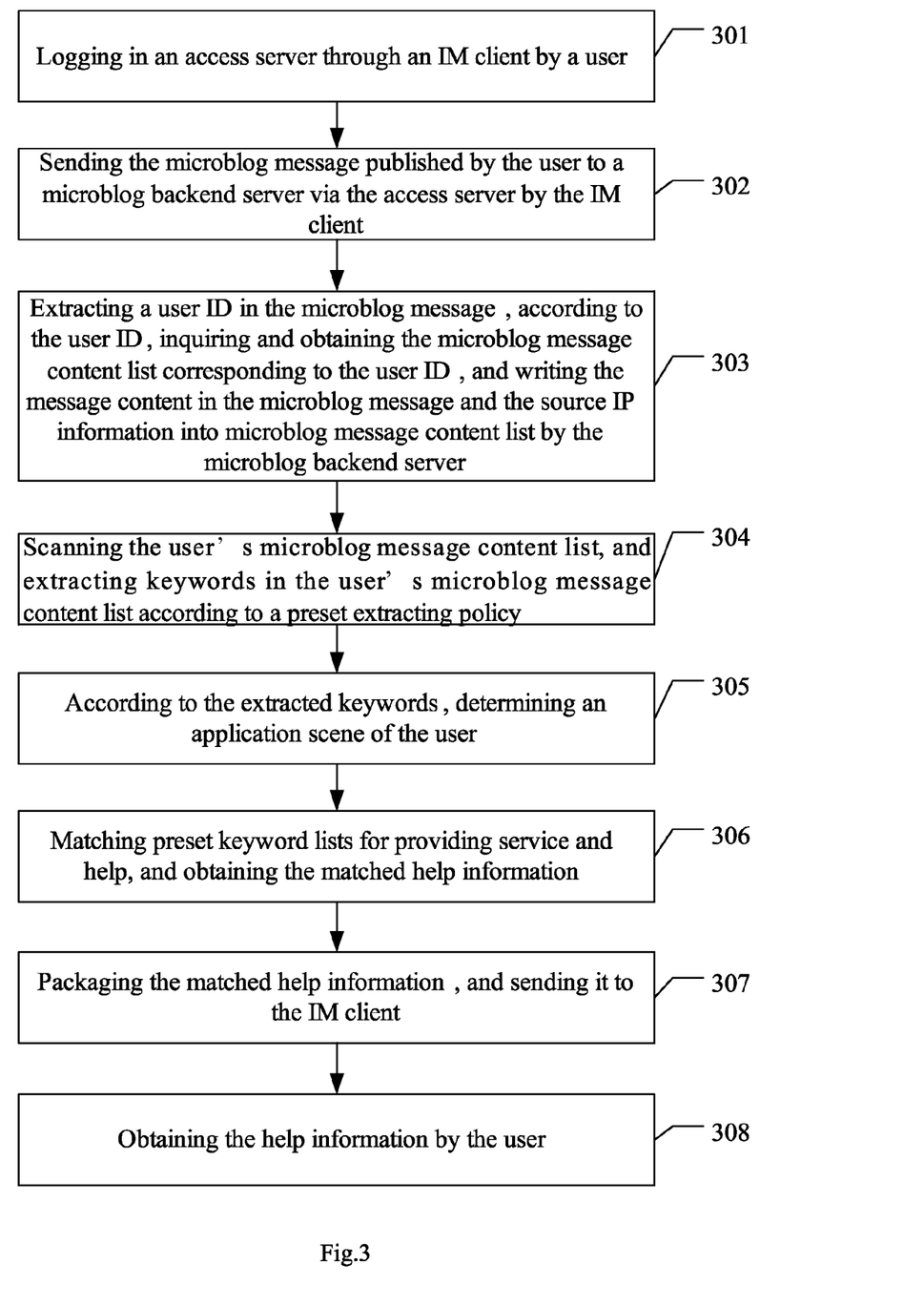
FIG. 3 is a specific flow diagram of the method for pushing information in an embodiment of the present disclosure.

FIG. 3 is the specific flow diagram of the method for pushing information in an embodiment of the present disclosure. As seen from FIG. 3, the procedure comprises:

Step 301, in which the user logs in an access server through an IM client. In this step, the user inputs his account number and password through the IM client, which are sent to the access server. After the access server verifies the login, a connect channel to the IM client is established. In the subsequent process, the IM client can ensure the connection to the access server by sending heartbeats at regular time. It should be made clear that, in the embodiment of the present disclosure, it is not limited to an IM client, but may also be any other client through which the user can execute relevant interface operations and interactions, such as, a text message client, a mobile phone client, etc.

Step 302, in which the IM client sends the microblog message published by the user to the microblog backend server via the access server. In this step, the IM client monitors the mouse click operations by the user, such as the user's clicking on the preset broadcast control, to confirm that the user desires to publish broadcast message. Then a corresponding broadcast window is created. After the user completes the input of the broadcast message content, the source IP (the current IP logged in by the user) information, the user ID, and the broadcast message content are encapsulated in a data package, which is sent to the microblog backend server via the access server. Of course, in actual application, the data package can be encrypted before being sent to the microblog message server of the microblog backend server via the access server.

Step 303, in which the microblog backend server extracts the user ID comprised in the microblog message. According to the user ID, the microblog backend server inquires and obtains the microblog message content list corresponding to the user ID, and writes the message content (message body) in the microblog message and the source IP information into the microblog message content list. In this step, the microblog message server receives the microblog message. After decrypting the message and confirming it to be an available data package, the microblog message server extracts the user ID, the message content and the source IP. According to the user ID, it finds out the microblog message content list corresponding to this user, and writes into a corresponding data structure which mainly includes the message content and the source IP information.

Step 304, which includes scanning the user's microblog message content list, and according to a preset extracting policy, extracting keywords from the user's microblog message content list. In this step, a statistical analysis server regularly scans all users' microblog message content lists in the microblog message server; or scans the stored microblog message content lists of the user according to a request of the user, such as, a microblog message published by the user containing help-seeking information. The statistical analysis server extracts the keywords according to the preset extracting policy. For example, keyword lists are matched with the microblog message published by the user in the microblog message content list. If the microblog message published by the user contains keywords which also are in the keywords lists, then the keywords are extracted. The extracted keywords are arranged according to a time line.

The keyword lists can be used to determine the application scene of the user. For example, for a user loving traveling, the keyword lists can include information about traveling. For example, the keyword lists can include the keywords like traveling, business trip, hotel, flight, etc. Thus, the application scene which the user is currently in can be determined by keyword matching, so that in the subsequent process, the matching processing only needs to be executed on the help information corresponding to the current application scene of the user, effectively reducing the scope of matching.

Step 305, which includes determining the application scene of the user according to the extracted keywords. In this step, according to the extracted keywords, a microblog intelligence server matches them with the keyword lists comprised in various application scenes, respectively, and determines the application scene of the user. Further, the microblog user server can also be inquired through the user ID to obtain the basic profile information of the user. Through the basic profile information, the age, the education, the profession, and other key information of the user can be confirmed for accurate positioning in the subsequent process.

Step 306, which includes matching the preset keyword lists for providing service and help, and obtaining the matched help information. In this step, a statistical analysis server, by packaging keywords obtained by matching, such as traveling, business trip, hotel, flight, the basic profile information of users who can provide services and so on, sends them to the microblog intelligence server. The microblog intelligence server inquiries corresponding intelligence relations, i.e. the prestored help information corresponding to the application scene, by using service providing queues which can provide providers of services such as traveling, business trip and flight. For example, traveling help information provided by travel agencies, accommodation help information provided by hotel operators, financial help information provided by financial service operators and so on constitute the help information corresponding to the application scenes. The travel agencies, hotel operators and financial service operators constitute the service providing queues. If the matched keywords are "Beijing", "XX hotel", "having meals", then by inquiring the intelligence relation by using service providing queue to obtain restaurants in Beijing, a list of restaurants can be found out.

Further, as mentioned above, restaurant information list matching with the user currently in the microblog intelligence server can be inquired by analyzing such information of the user as profession, age, education and so on. In an embodiment of the present disclosure, the function of profession, age and education is for a better matching. For example, according to the degree of education, the user's incomes can be known. If the user has received a higher academic degree, higher-level restaurant information may be further provided. If the user is older and some restaurants show orientation to groups of older persons, a matching is executed more conveniently in such a manner.

Step 307, which includes packaging the matched help information and sending it to the IM client. In this step, the microblog intelligence server packages the matched corresponding help information, such as packaging the list of restaurant information near a certain hotel in Beijing into a help information data package, and forwards information corresponding to this account number.

Step 308, in which the user obtains help information. In this step, the IM client parses and decrypts the received help information. After confirming it as an available data package, the IM client displays it to the user to view by the corresponding created interface message item control. In this way, the user can obtain the valuable help information which is possibly required for the current scene.

It can be seen from the above that, there are following operation in the method, device and system for pushing information provided by the present disclosure, obtaining and storing a microblog message published through an IM client by a user; scanning the stored microblog message and obtaining keywords of the microblog message according to a preset extracting policy; and determining an application scene of the user according to the obtained keywords, matching the application scene with corresponding prestored help information, and obtaining and pushing the matched help information. A microblog backend server is configured to extract the keywords, analyze the application scene of the user in combination with the basic information of user profiles or current login IP, and match the extracted keywords with the stored help information corresponding to the application scene. Thus, the pushed help information can be relatively concise, but has high relevance. The accuracy and the reliability in pushing information are improved. The user can be helped relatively appropriately to solve the current possible problems.

What are mentioned above are only preferable embodiments of the present disclosure, and are not intended to limit the present disclosure. Any amendment, equal replacement, improvement and so on, made within the spirit and principle of the present disclosure, shall be included in the scope of protection of the present disclosure.

What is claimed is:

1. A method for pushing information, comprising:
obtaining and storing a microblog message published through an Instant Messaging client by a user;
scanning the stored microblog message and obtaining one or more keyword(s) of the microblog message according to a preset extracting policy; and
determining an application scene of the user according to the obtained keyword(s), matching the application scene with the corresponding prestored help information thereof, and obtaining and pushing the matched help information;
wherein the determining the application scene of the user according to the obtained keyword(s), the matching the application scene with the corresponding prestored help information thereof, and the obtaining and pushing the matched help information comprise:
in the keyword lists corresponding to various application scenes, determining one keyword list that most matches the obtained keyword(s), and setting an application scene corresponding to the determined keyword list as the application scene of the user; and
determining the first level of the menus of the help information corresponding to the application scene of the user; according to the one or more keyword(s) comprised in the first level of the menus, traversing the obtained keyword(s) and determining the first level to which the obtained keyword(s) belong(s); according to keywords comprised in a second level of the menus of the help information, traversing the obtained keyword(s) and determining the second level to which the obtained keyword(s) belong(s); continuing traversing till the obtained keyword(s) include(s) no keyword of any corresponding menu; and pushing the help information corresponding to the upper level menu of the last determined menu.

2. The method according to claim 1, wherein the storing a microblog message includes storing the microblog message in a way of a microblog message content list and the method further comprises identifying the microblog message content list with a user ID;

the scanning the stored microblog message and obtaining the one or more keyword(s) of the microblog message according to the preset extracting policy comprises:
scanning the microblog message content list at regular time, and extracting the one or more keyword(s) comprised in the microblog message content list according to the preset extracting policy.

3. The method according to claim 2, wherein the extracting the one or more keyword(s) comprised in the microblog message content list according to the preset extracting policy comprises:
matching the microblog message content list with preset keyword lists corresponding to various application scenes, and obtaining the one or more keyword(s), which matches the preset keyword lists corresponding to various application scenes, from the microblog message content list.

4. The method according to claim 3, wherein the help information is stored in a form of cascading menus, wherein a first level of the menus of the help information is identified by the application scenes, and each level of the menus under the first level is identified by one or more corresponding keyword(s).

5. The method according to claim 1, further comprising:
according to location information or a user ID comprised in a microblog message body of the microblog message, obtaining a stored basic profile of the user;
rematching the obtained basic profile of the user with the help information obtained by the matching, and pushing the help information obtained by the rematching.

6. A microblog backend server, comprising: a microblog message server, a statistical analysis server and a microblog intelligence server, wherein,
the microblog message server is configured to store a microblog message published by a user;
the statistical analysis server is configured to extract one or more keyword(s) from the microblog message according to a preset extracting policy;
the microblog intelligence server is configured to determine an application scene of the user according to the extracted keyword(s), match the application scene with the corresponding prestored help information thereof, and obtain and push the matched help information;
wherein the determining the application scene of the user according to the obtained keyword(s), the matching the application scene with the corresponding prestored help information thereof, and the obtaining and pushing the matched help information comprise:
in the keyword lists corresponding to various application scenes, determining one keyword list that most matches the obtained keyword(s), and setting an application scene corresponding to the determined keyword list as the application scene of the user; and
determining the first level of the menus of the help information corresponding to the application scene of the user; according to the one or more keyword(s) comprised in the first level of the menus, traversing the obtained keyword(s) and determining the first level to which the obtained keyword(s) belong(s); according to keywords comprised in a second level of the menus of the help information, traversing the obtained keyword(s) and determining the second level to which the obtained keyword(s) belong(s); continuing traversing till the obtained keyword(s) include(s) no keyword of any corresponding menu; and pushing the help information corresponding to the upper level menu of the last determined menu.

7. The microblog backend server according to claim 6, further comprising:
a microblog user server, configured to: store basic information of the user, and according to location information or a user ID comprised in a microblog message body of the microblog message, inquiry, obtain and output the stored basic information of the user to the microblog intelligence server to rematch with the help information obtained by the matching.

8. A system for pushing information, comprising: an Instant Messaging client, an access server and a microblog backend server, wherein,
the Instant Messaging client is configured to: send, via the access server, a microblog message to be published to the microblog backend server; receive, via the access server, help information output by the microblog backend server; and display the help information to a user; and
the microblog backend server is configured to: obtain and store the microblog message published through the Instant Messaging client by the user; scan the published microblog message and obtain one or more keyword(s) of the microblog message according to a preset extracting policy; determine an application scene of the user according to the obtained keyword(s); match the application scene with the corresponding prestored help information thereof; and obtain and push the matched help information;
wherein the determining the application scene of the user according to the obtained keyword(s), the matching the application scene with the corresponding prestored help information thereof, and the obtaining and pushing the matched help information comprise:
in the keyword lists corresponding to various application scenes, determining one keyword list that most matches the obtained keyword(s), and setting an application scene corresponding to the determined keyword list as the application scene of the user; and
determining the first level of the menus of the help information corresponding to the application scene of the user; according to the one or more keyword(s) comprised in the first level of the menus, traversing the obtained keyword(s) and determining the first level to which the obtained keyword(s) belong(s); according to keywords comprised in a second level of the menus of the help information, traversing the obtained keyword(s) and determining the second level to which the obtained keyword(s) belong(s); continuing traversing till the obtained keyword(s) include(s) no keyword of any corresponding menu; and pushing the help information corresponding to the upper level menu of the last determined menu.

9. The system according to claim 8, wherein the microblog backend server comprises: a microblog message server, a statistical analysis server and a microblog intelligence server, wherein,
the microblog message server is configured to store the microblog message published by the user;
the statistical analysis server is configured to extract the one or more keyword(s) from the microblog message published by the user according to the preset extracting policy;
the microblog intelligence server is configured to: determine the application scene of the user according to the extracted keyword(s), match the application scene with the corresponding prestored help information, obtain and push the matched help information.

10. The system according to claim 9, wherein the microblog backend server further comprises:
   a microblog user server configured to: store basic information of the user; and according to location information or a user ID comprised in a microblog message body of the microblog message, inquiry, obtain and output the stored basic information of the user to the microblog intelligence server to rematch with the help information obtained by the matching.

* * * * *